June 29, 1926.
R. E. HELLMUND
1,590,508
TRANSMISSION SYSTEM
Filed Nov. 12, 1923  2 Sheets-Sheet 2
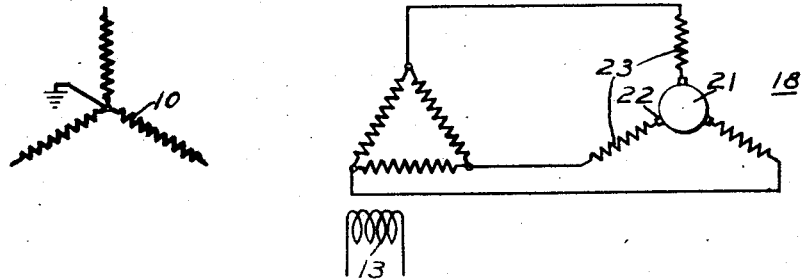
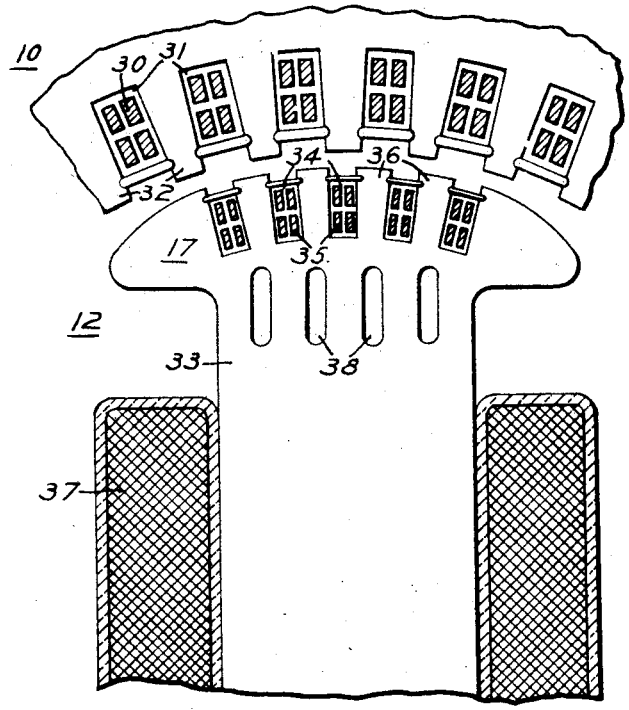
WITNESSES:
INVENTOR
Rudolf E. Hellmund.
BY
ATTORNEY Patented June 29, 1926.

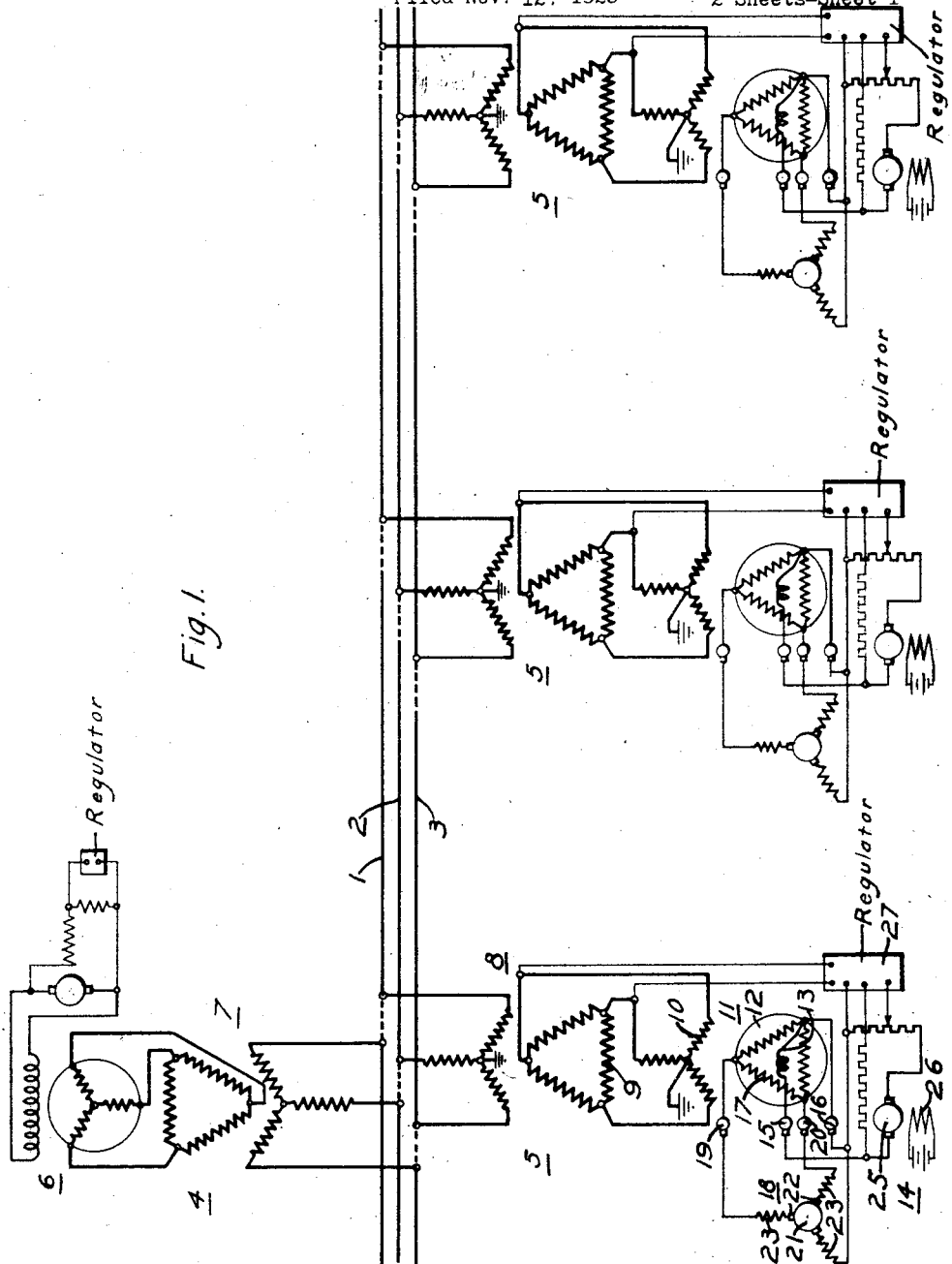

1,590,508

UNITED STATES PATENT OFFICE.

RUDOLF E. HELLMUND, OF PITTSBURGH, PENNSYLVANIA, ASSIGNOR TO WESTINGHOUSE ELECTRIC & MANUFACTURING COMPANY, A CORPORATION OF PENNSYLVANIA.

TRANSMISSION SYSTEM.

Application filed November 12, 1923. Serial No. 674,103.

My invention relates to electrical-power-transmission lines or systems and particularly to those for the transmission of power at high voltages over long distances.

In a copending application of Frank G. Baum, Serial No. 569,704, filed June 20, 1922, is shown a system that is particularly adapted to high-voltage long-distance transmission of electrical power, this system embodying a plurality of synchronous condensers spaced along the line and adapted to provide the wattless current required in each section of the line between condenser stations, whereby a substantially constant voltage may be maintained throughout a relatively long transmission line.

Synchronous condensers, which are employed to a certain extent for regulation of the power-factor or the voltage of transmission or distribution lines, have a certain natural tendency to oscillate or hunt, particularly in cases where surges or sudden changes of load are liable to occur. It is one object of my present invention, therefore, to increase the stability of a system of the character outlined, in case such increase is necessary or desirable, by improving the operating characteristics of the synchronous condensers in such manner that oscillation or hunting is substantially eliminated.

More specifically stated, it is the object of my invention to provide synchronous condensers that are employed in a system of the above-indicated character with phase-wound damper windings, to which a polyphase series generator, or the equivalent, is connected to produce the effect of substantially zero resistance of the damper windings.

It is well known that the tendency of synchronous machines to hunt or oscillate may be reduced to a certain extent by the use of the familiar squirrel-cage damper windings, whereby, in case the machine tends to "slip a pole", a certain torque is set up to counteract any further slippage or hunting. If the damper windings of substantially zero resistance are utilized and the machine is provided with a small air gap and a large number of coil slots, hunting is substantially eliminated.

In order to provide the effect of substantially zero resistance in the damper windings, according to my invention, they are made of the phase-wound type, and a single-phase series generator or one phase of a polyphase series generator is connected in series relation with each phase section of the damper windings. Such generator or generators will act in the capacity of negative resistance to make the total or effective resistance of the damper-winding circuit substantially zero. The small air gap that is desirable for the induction-motor action of the damper winding is, on the other hand, undesirable, as regards the synchronous operation of the machine. However, the equivalent of a large air gap may be obtained by providing a highly saturated iron core between the damper windings and the direct-current field coils, the saturation being ensured by providing slots or holes in the polar projections.

My invention may be best understood by reference to the accompanying drawings,—

Figure 1 of which is a diagrammatic view of a transmission and distribution system organized in accordance with my present invention;

Fig. 2 is a simplified diagrammatic view of a portion of the system that is shown in Fig. 1; and Fig. 3 is a sectional view of a portion of a synchronous condenser constructed in accordance with the principles of the present invention.

Referring to Fig. 1 of the drawings, the system here shown comprises a plurality of transmission lines or conductors 1, 2 and 3, constituting a 3-phase high-voltage circuit, to which one or more sources of energy or generating stations 4 are connected, and a plurality of synchronous condenser substations 5 are also connected at spaced points along the line remote from the generating station or stations. The generating stations 4 may be of any suitable steam or hydraulically driven type, comprising an alternating-current generator 6 that is connected to the transmission-line conductors 1, 2 and 3 through a suitable step-up transformer 7. The generator 6 is regulated for constant voltage, as indicated.

Each of the synchronous condenser substations 5 comprises a suitable step-down transformer 8, the secondary winding 9 of which is connected to the primary or stator winding 10 of a synchronous condenser 11. The rotor 12 of the synchronous condenser embodies a direct-current exciting or field winding 13, which is connected to an exciter 14 by means of suitable slip rings 15 and 16. The rotor 12 also embodies a phase-wound damper winding 17, preferably disposed as shown in Fig. 3 and connected, through slip rings 16, 19 and 20, to the respective terminals of a polyphase series generator 18.

The polyphase series generator 18 comprises a commutator-type armature 21 having a plurality of spaced sets of brushes 22 bearing upon the commutator thereof and respectively connected in series relation with exciter field windings 23, as best shown in Fig. 2. The generator 18 may be mounted upon the shaft of the synchronous motor 11 to be driven thereby, or may be driven in any other suitable manner, as by a small synchronous motor connected to the secondary transformer winding 9.

The exciter 14 may be of any familiar type and is shown as comprising a commutator-type armature 25 and a separately-excited field winding 26. A regulator 27 is adapted to govern the excitation of the synchronous-condenser field winding 13 in such manner as to maintain a substantially constant voltage upon the transmission line at the corresponding substation.

The particular type of regulator to be employed is not relevant to the present invention and any suitable regulator for automatically over-exciting and under-exciting the field winding 13, as desired, may be employed. As examples of such regulator, reference may be had to Tirrill Patent No. 1,192,708, which was granted July 25, 1916, and to a copending application of H. A. Travers, regulator systems, Serial No. 540,178, filed March 1, 1922, and assigned to the Westinghouse Electric & Manufacturing Company.

It will be understood that, in lieu of the polyphase series generator 18, three independent series generators, respectively connected in circuit with the terminals of the phase-wound damper winding 17, may be employed, if desired.

By the provision of the polyphase series generator 18 or its equivalent, the effective resistance of the damper winding may be made substantially zero, inasmuch as the generator acts in the capacity of a negative resistance. In this way, the natural hunting tendency of the corresponding synchronous condenser may be greatly reduced, as previously explained, and the further provision of the type of field-magnet structure that is shown in Fig. 3 insures that this hunting tendency will be substantially eliminated.

Referring to Fig. 3, the structure here shown comprises a plurality of slots 31 that are cut in the laminations of the stator 10 and contain a plurality of phase-wound conductors 30, in accordance with a familiar practice. Between the adjacent slots, a plurality of teeth 32 are thus provided, the length of which, in conjunction with the teeth 36 of the rotor 12, determine the effective air gap of the synchronous condenser.

The rotor 12 likewise embodies a plurality of slots 34, containing conductors 35 constituting the phase-wound damper windings 17, as diagrammatically illustrated in Figs. 1 and 2. Each polar projection 33 is provided with a field-magnet coil 37, in accordance with familiar practice, while, between the damper winding 17 and the field coil 37, a plurality of slots or holes 38 are provided, in order to produce a highly saturated iron core during the operation of the machine. In this way, the equivalent of a relatively large air gap may be obtained, to assist in the synchronous operation of the machine, although a relatively small air gap is actually provided between the sets of teeth 32 and 36, to assist the induction-motor action of the damper winding 17, as previously explained.

By the provision of synchronous condensers constructed in accordance with my present invention, a substantially zero effective resistance of the phase-wound damper windings is provided, which, in conjunction with a relatively small air gap and a relatively larger number of polar projections, insures that the natural hunting tendency of the synchronous-condenser rotor is substantially avoided, whereby the stability of operation of the transmission system, as a whole, is greatly improved.

I do not wish to be restricted to the specific structural details, circuit connections or arrangement of parts herein set forth, as various modifications may be made therein without departing from the spirit and scope of my invention. I desire, therefore, to be limited only by the scope of the appended claims.

I claim as my invention:

1. A system of power transmission comprising a transmission line, a source of energy connected thereto, a synchronous condenser connected to the line at a point remote from said source, the rotor of said condenser having a damper winding, and means for materially reducing the effective resistance of said damper winding to effect a reduction in the natural hunting tendency of said rotor, portions of said rotor being apertured to provide certain effects of an increased air gap and assist in the synchronous operation of the condenser.

2. A system of power transmission comprising a transmission line, a source of energy connected thereto, a synchronous condenser connected to the line at a point remote from said source, the rotor of said condenser having a phase-wound damper winding, and means for materially reducing the effective resistance of the respective phase circuits of said damper winding, to effect a reduction in the natural hunting tendency of said rotor, portions of said rotor being apertured to produce a highly saturated magnetic circuit and assist in the synchronous operation of the condenser.

3. A system of power transmission comprising a transmission line, a source of energy connected thereto, a synchronous condenser connected to the line at a point remote from said source, the rotor of said condenser having a phase-wound damper winding, and a series generator winding connected to each phase circuit of said damper winding to effect a reduction in the natural hunting tendency of said rotor, portions of said rotor being apertured near the periphery to effect saturation of the corresponding portions of the magnetic circuit and assist in the synchronous operation of the condenser.

4. A system of power transmission comprising a transmission line, a source of energy connected thereto, a synchronous condenser connected to the line at a point remote from said source, the rotor of said condenser having polar projections and a damper winding, and means for materially reducing the effective resistance of said damper winding to effect a reduction in the natural hunting tendency of said rotor, the polar projections of said rotor being apertured to provide certain effects of an increased air gap and assist in the synchronous operation of the condenser, the actual air gap being relatively small to assist the induction-motor action of said damper winding.

5. A system of power transmission comprising a transmission line, a source of energy connected thereto, a synchronous condenser connected to the line at a point remote from said source, the rotor of said condenser having polar projections and a phase-wound damper winding, and means for materially reducing the effective resistance of the respective phase circuits of said damper winding, to effect a reduction in the natural hunting tendency of said rotor, the polar projections of said rotor being apertured to produce a highly saturated magnetic circuit and assist in the synchronous operation of the condenser, the actual air gap being relatively small to assist the induction-motor action of said damper winding.

6. A system of power transmission comprising a transmission line, a source of energy connected thereto, a synchronous condenser connected to the line at a point remote from said source, the rotor of said condenser having polar projections and a phase-wound damper winding, and a series generator winding connected to each phase circuit of said damper winding to effect a reduction in the natural hunting tendency of said rotor, the polar projections of said rotor being apertured near the corresponding polar faces to effect saturation of the corresponding portions of the magnetic circuit and assist in the synchronous operation of the condenser, the actual air gap being relatively small to assist the induction-motor action of said damper winding.

In testimony whereof, I have hereunto subscribed my name this 6th day of November 1923.

RUDOLF E. HELLMUND.